(12) United States Patent
Dobberpuhl et al.

(10) Patent No.: US 7,076,691 B1
(45) Date of Patent: Jul. 11, 2006

(54) ROBUST INDICATION PROCESSING FAILURE MODE HANDLING

(75) Inventors: Walter T. Dobberpuhl, Southborough, MA (US); Brian R. Gruttadauria, Sutton, MA (US); Munish T. Desai, Shrewsbury, MA (US); Gregory W. Lazar, Upton, MA (US); Andreas L. Bauer, Maynard, MA (US)

(73) Assignee: EMC Corporation, Hopkinton, MA (US)

( * ) Notice: Subject to any disclaimer, the term of this patent is extended or adjusted under 35 U.S.C. 154(b) by 751 days.

(21) Appl. No.: 10/242,521

(22) Filed: Sep. 12, 2002

Related U.S. Application Data

(63) Continuation-in-part of application No. 10/172,615, filed on Jun. 14, 2002.

(51) Int. Cl.
*G06F 11/00* (2006.01)

(52) U.S. Cl. .............................. 714/13; 714/10; 714/11

(58) Field of Classification Search .................... 714/4, 714/10, 11, 12, 13, 9
See application file for complete search history.

(56) References Cited

U.S. PATENT DOCUMENTS

| | | | |
|---|---|---|---|
| 6,282,610 B1 * | 8/2001 | Bergsten | 711/114 |
| 6,345,368 B1 * | 2/2002 | Bergsten | 714/11 |
| 6,449,732 B1 * | 9/2002 | Rasmussen et al. | 714/12 |
| 6,601,186 B1 * | 7/2003 | Fox et al. | 714/4 |
| 6,886,107 B1 * | 4/2005 | Walsh et al. | 714/4 |

* cited by examiner

*Primary Examiner*—Scott Baderman
*Assistant Examiner*—Timothy M Bonura
(74) *Attorney, Agent, or Firm*—Krishnendu Gupta; Robert Kevin Perkins

(57) ABSTRACT

A technique for handling failure modes which may occur during the processing of indications. In a client-server environment such as a client-server network used in computer data storage running object-oriented software, the client may subscribe for certain indications on certain objects in the servers. When the state of any of those certain objects change, an indication is fired back to the client to indicate a state change. Failures in the client, server, or connection therebetween reduce the effectiveness of this state-change notification scheme. The present invention mitigates the impact of such failures, employing a technique by which a failed storage processor in a server can failover to another storage processor in the same server to enable the seamless transition of the processing of such indications to the other processor without stopping and by which the server can destroy any of its resources that were dedicated to the processing of indications for a specific client if and when such client fails.

25 Claims, 10 Drawing Sheets

| CLUSTER NO. | STORAGE PROCESSOR NODE | FUNCTIONAL STATE | OPERATIVE STATE |
|---|---|---|---|
| 255 | IP ADDRESS SP-1 | ACTIVE | OPERATIVE |
| 255 | IP ADDRESS SP-2 | PASSIVE | OPERATIVE |
| 255 | IP ADDRESS SP-3 | PASSIVE | OPERATIVE |

FIGURE 5

(CLUSTER MANAGER TABLE 402 FOR SERVER 202 BEFORE FAILOVER)

| CLUSTER NO. | STORAGE PROCESSOR NODE | FUNCTIONAL STATE | OPERATIVE STATE |
|---|---|---|---|
| 255 | IP ADDRESS SP-1 | PASSIVE | FAILED |
| 255 | IP ADDRESS SP-2 | ACTIVE | OPERATIVE |
| 255 | IP ADDRESS SP-3 | PASSIVE | OPERATIVE |

FIGURE 6

(CLUSTER MANAGER TABLE 402 FOR SERVER 202 AFTER FAILOVER)

| INSTANCE NAME | OBSERVER PROPERTY OBJECT |
|---|---|
| XXX_LUN0 | LUN0......NAME, FAULT STATUS, ......FUNCC1 |
| XXX_LUN1 | LUN1......NAME, FAULT STATUS, ......FUNCC2 |
| XXX_LUN2 | LUN2......NAME, FAULT STATUS, ......FUNCC3 |

FIGURE 7 (OBJECT POOL MANAGER TABLE)

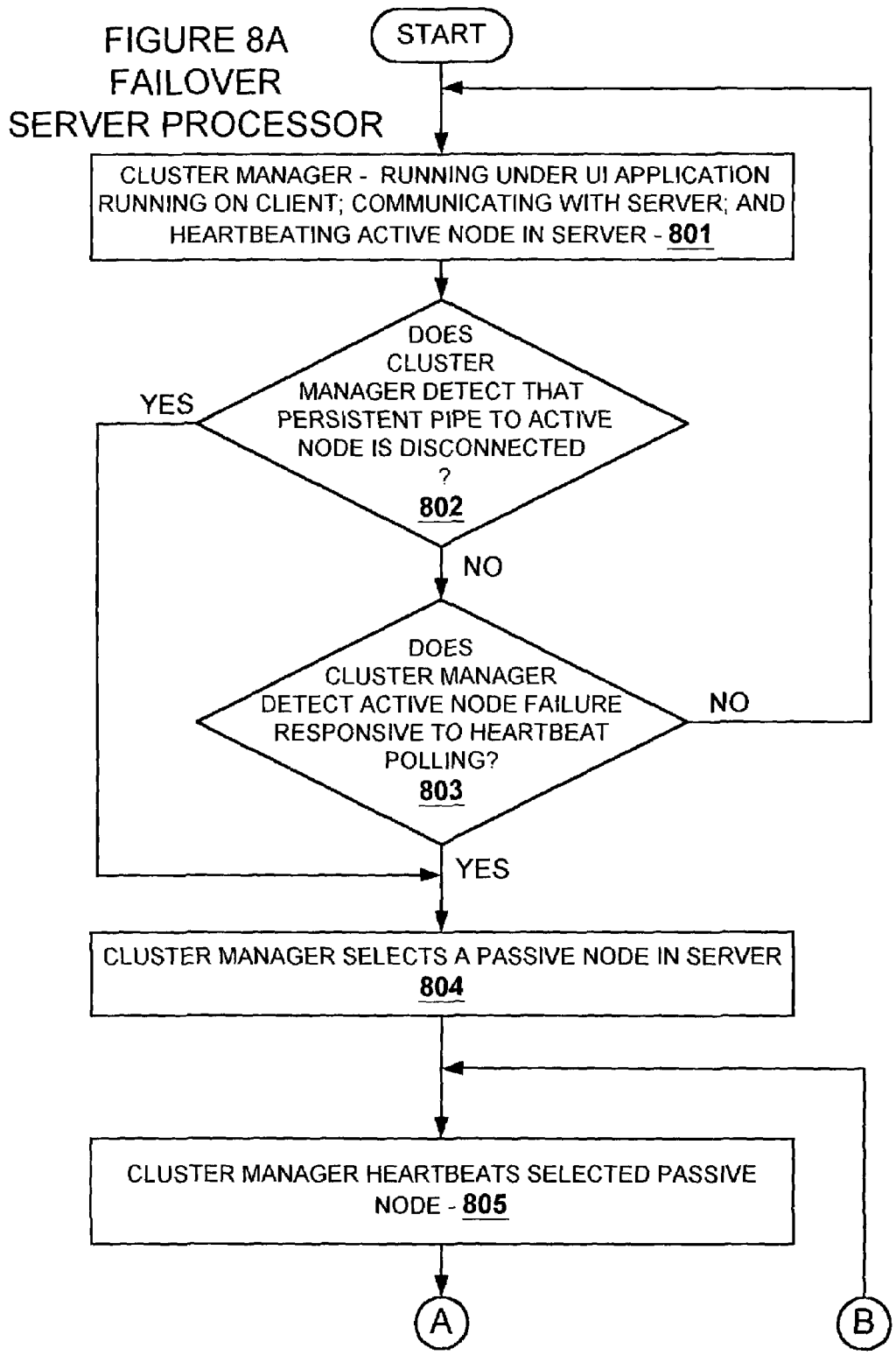

SERVER PROCESSOR
FAILOVER

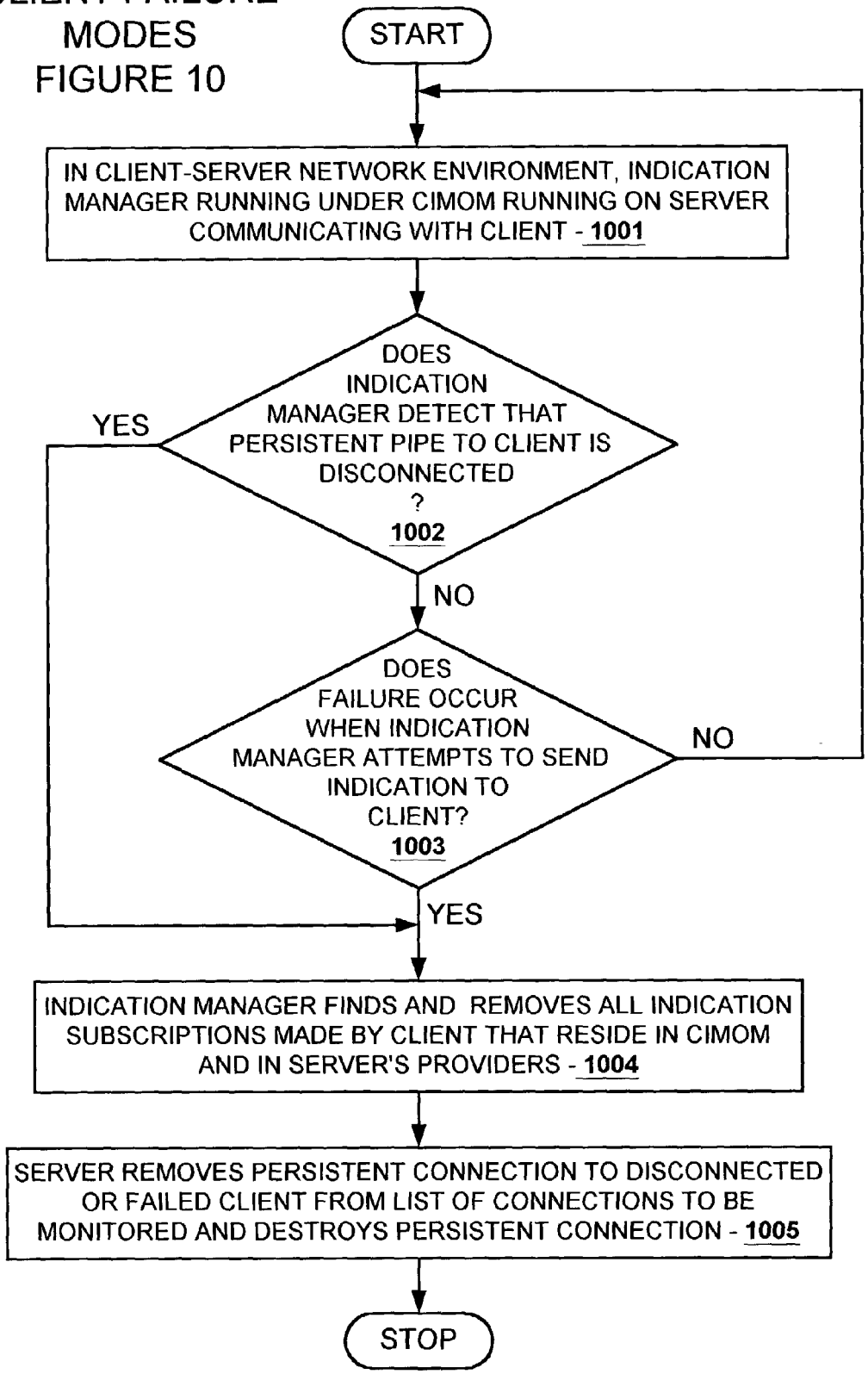

ROBUST INDICATION PROCESSING FAILURE MODE HANDLING

CROSS REFERENCE TO RELATED APPLICATIONS

This instant application is a continuation in part (CIP) of U.S. patent application Ser. No. 10/172,615, filed Jun. 14, 2002 entitled "Robust Indication Processing", having inventors: Andreas L. Bauer, Gregory W. Lazar, Walter T. Dobberpuhl, Sriram Krishnan, and Timothy M. Meggison, and being assigned to the assignee of the instant application. U.S. patent application Ser. No. 10/172,615 is hereby incorporated by reference herein, and shall hereinafter be referred to as "Parent Application". Benefits are claimed under 35 U.S.C. § 120.

BACKGROUND OF THE INVENTION

A portion of the disclosure of this patent document may contain command formats and/or other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to apparatus, methodology, systems, and/or computer program product for monitoring nodes in a client server environment and, more particularly, relates to the handling of client and/or server failure modes associated with the processing of indications which are sent from indication publishers or sources in those servers to indication subscribers in those clients.

2. Description of Prior Art

Client-server network configurations are well known in the computer arts. A client requests information and such information is provided, or served-up, by its server(s). A human user of the network, or his/her graphical user interface (GUI), can be conceptualized as a "client" who is being served by the network or the network's components. Reference is made to FIG. 1 wherein network 100 shows user interface or client 101 in communication with servers 102, 103, and 104 over bus structure 105. Client 101 makes requests of any one or more of these servers which provide, or serve up, the requested information back to the client over the bus. And, within the nodes of such network (within client 101 or any of the servers), inanimate hardware/software sub-systems, other nodes, or processes that are being "served" in some capacity by other such sub-systems, nodes, or processes ("servers") are also referred to as "clients" of those servers.

Management of these client-server networks is a very important function that must be maintained to ensure that the networks operate as intended and serve network users as expected. This management function may be accomplished through distributed management software which can be distributed within a client-server network. If a client-server network is running such software that is also object-oriented, typically many objects reside in each of the clients and/or servers. Information from each of these objects may be necessary to satisfy certain information requests in pursuit of executing certain distributed management software functions. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor (a kind of computer) each object may describe or relate to a specific tangible detail in the processor (e.g. a fan, power switch, cache memory, power supply, disk drive interface, etc.), where these tangible objects in the storage processor can send messages to each other and to other objects outside the processor.

As noted, it is important to have this management software run as efficiently as possible. In order to manage various components of a client-server network such as a storage network, there has to be frequent, if not continuous, monitoring of operation of at least the important objects comprising various critical aspects of, for example, a storage system in that storage network. One of the techniques used to monitor objects within an object-oriented network involves "observers" or "observer objects" which are used to observe or monitor "subject objects". When a subject object changes state, it "fires back" an instantaneous indication thereof to a component that is interested in the state change of that subject object. The subject object is the "indication source". The "indication" is the message sent by subject object to observer object, or from server to client, to indicate a change has occurred. The observer or its client can be viewed as an "indication subscriber" or a "subscriber to indications" where the observer observes the change of state and its client is interested in the change. The "indication subscription" is the "request" for the indication or state-change-message, and reflects the interest that the subscriber or client has in the event. "Observer infrastructure" is whatever is required to enable the indication to be sent from subject object to observer object. The subject object can be grouped with other objects within a package termed a "provider".

That change of state, once detected and communicated by way of this observer or indication technique, can then be managed by the distributed management software. This activity is termed "asynchronous" notification, which is very efficient as contrasted with slower and arguably more complex prior notification techniques which provided each notification only in response to an individual request. Asynchronous notification does not have to wait for an individual request to be made—it employs objects which are set at "hair-trigger" alertness to react simultaneously with observed state changes in their respective subject objects.

Industry standards committees have evolved to bring uniformity to different developmental directions where possible. One such committee is known as Distributed management Task Force (DMTF) and has generated a particular standard called Web Based Enterprise Management (WBEM) using the Common Information Model (CIM). Asynchronous notifications may now be implemented substantially in accordance with CIM and the WBEM standard. Asynchronous notification was used, and observers were discussed, in U.S. patent application Ser. No. 10/027,694 filed Dec. 20, 2001, entitled: "Data Replication Facility for Distributed Computing Environments", inventors: R. J. Nordin, A. L. Bauer, S. Krishnan, and G. W. Lazar, assigned to the assignee of the instant application, and hereby incorporated herein by reference in its entirety. For further background information on the subject of observers, a good text reference is: "Design Patterns", authored by Erich Gamma, et al, published by Addison-Wesley, Chapter 5, starting at page 293 thereof, such chapter hereby incorporated herein by reference in its entirety.

However, despite the improved efficiencies provided by asynchronous notification, there are shortcomings related to failures of client or server. For example, the client itself may fail, or the server itself may fail, or power to either may be interrupted causing failure, or connections between client and server which carry these asynchronous notifications may not stay connected in every instance. Therefore, there is a need for handling client or server related failures in a manner that mitigates their impact. Applicants' invention provides techniques for handling these problems.

SUMMARY OF THE INVENTION

Embodiments of the present invention include apparatus, methodology, systems, and/or computer program product in or as techniques for handling failures related to the processing of computer software object indications. These failures may be client-related, server-related, or both. In a first aspect of the present invention, in a client-server network having a plurality of objects, at least one client and at least one server, a technique is provided for handling server failure while monitoring the state of, or processing such indications on, at least certain of the objects. The technique comprises a plurality of processors within the server, establishing one of the processors to be active and the other processors to be inactive in the network, determining if the active processor is operative, and if the active processor is not operative establishing one of the other processors to be active in the network. In a further feature, the server is a storage system and the processors are storage processors.

In another aspect of the present invention, a technique for handling client failure during indication processing comprises causing the server to dedicate certain resources in the server to achieve the monitoring or processing of indications for the client, determining if the client is operative, and if the client is not operative dismantling the resources. The resources include a persistent pipe connection and any observer infrastructure dedicated to processing such indications including indication subscriptions.

In a further feature of the present invention, determining the operability of the active processor includes heartbeating or periodically polling the active processor to elicit a response indicative of operability or non-operability. If the active processor is not operable, there is sequential polling of the other processors to elicit a response indicative of operability or non operability of the other processors. The sequential polling is stopped when a response from one of the other processors is indicative of operability and it is selected as the active processor. If the sequential polling does not elicit a response indicative of operability, then all of the processors are polled in repetitive sequence until a response from any one of them (including the original active processor) is indicative of operability and is selected as the active processor.

It is thus advantageous to employ the present invention in client-server networks in which software object indications are being processed because the processing of such indications may be continued through failover to a peer processor in the event of processor failure in the server, and resources that were dedicated to processing indications in the server may be dismantled and thus preserved for effective use in performing other tasks in the server in the event of failure in the client.

BRIEF DESCRIPTION OF THE DRAWINGS

FIG. 5 is a table contained within the cluster manager of FIG. 4 depicting conditions before a failover condition occurs;

FIG. 6 is the table of FIG. 5 depicting conditions after a failover condition occurs;

FIG. 7 is a table contained within the object pool manager of FIG. 3;

FIGS. 8A and 8B are inter-related flowcharts depicting steps undertaken by the present invention during a server processor failover operation;

DESCRIPTION OF THE PREFERRED EMBODIMENTS

Figure 1:
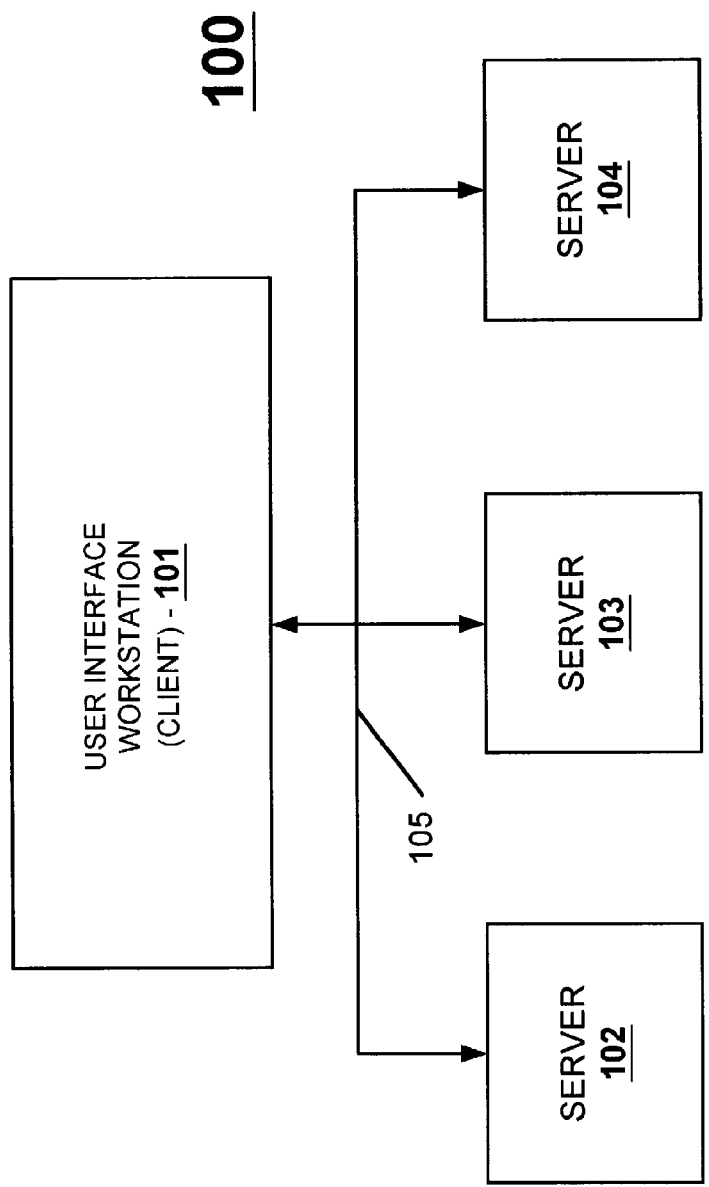
FIG. 1 is a block diagram showing a prior-art client-server network.

Preferred embodiments of the present invention are implementations of principles of the present invention. Like reference numerals in different Figures represent like or similar items. The present invention relates to an improved technique for handling failure of client and/or server and/or connections therebetween relative to the processing of indications, the technique mitigating the impact of such failure. Clients and servers may typically be computers which are configured to run, or capable or running, computer program product including a computer-usable medium having computer readable program code thereon.

Figure 2:
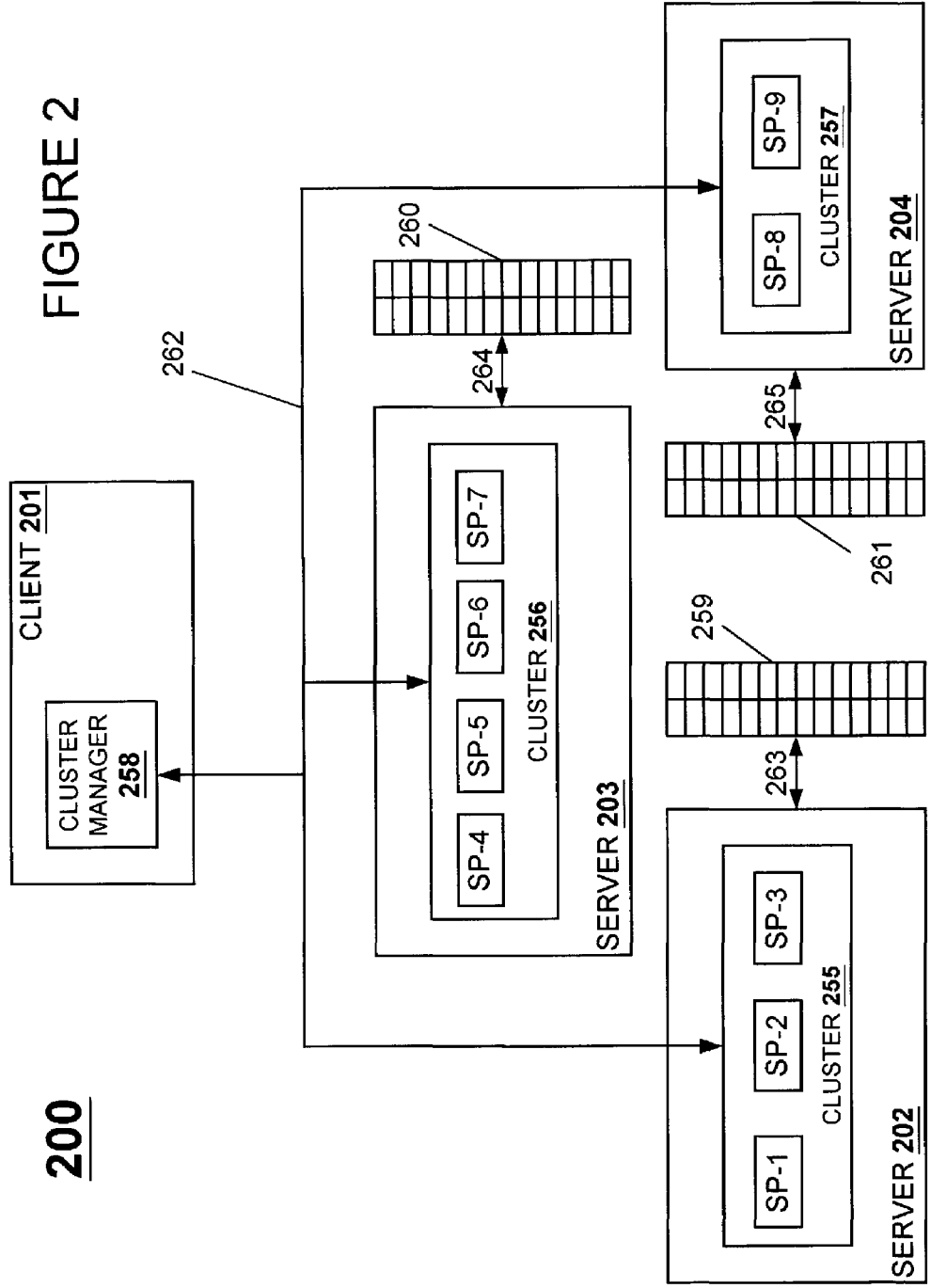
FIG. 2 is a block diagram of a client-server storage network in accordance with principles of the present invention.

FIG. 2—Storage Processor Failover Overview

FIG. 2 is an exemplary block diagram of client-server storage network 200 in accordance with principles of the present invention. Client or workstation (including terminal, keyboard, mouse, etc.—not shown) 201 is connected to servers 202, 203, and 204 via network link 262 which may be a Transmission Control Protocol/Internet Protocol (TCP/IP) link if client-server network 200 is operating within the Internet environment. More specifically, link 262 interconnects cluster manager software object 258 located in client 201 and running on its User Interface (UI) software application, with the cluster software object or cluster in each of the network's various servers. Cluster object 255 is located in server 202 and runs on the Common Information Model Object Manager (CIMOM) of server 202; cluster 255 includes storage processors SP-1, SP-2, and SP-3. Cluster object 256 is located in server 203 and runs on the CIMOM of server 203; cluster 256 includes storage processor SP-4, SP-5, SP-6, and SP-7. Cluster object 257 is located in server 204 and runs on the CIMOM of server 204; cluster 257 includes storage processors SP-8 and SP-9. Server 202 is operatively coupled via network link 263 to storage or disk array 259. Server 203 is operatively coupled via network link 264 to disk array 260. And, server 204 is operatively coupled via network link 265 to disk array 261. These links may also be based on TCP/IP protocol. Additional or fewer servers than those shown containing additional or fewer storage processors than those shown could be used in accordance with principles of the present invention which is not limited to any specific network configuration.

Cluster manager software object 258 maintains or monitors the state of all nodes such as storage processors SP-1 through SP-9, that the User Interface (UI) software or application is managing. For example, server 204, which includes cluster 257 with two storage processors SP-8 and SP-9, may represent an EMC Corporation EMC CLARiiON® server which currently consists of two storage processors. Cluster manager 258 maintains a table (to be discussed in connection with FIGS. 5 and 6 hereinbelow) where each row of the table contains an entry for the cluster with IP address and state of each node of the cluster. During operation of the client-server network at a given point in time, only one node of a cluster may be "active" (the node with which the cluster manager is communicating), and the other nodes shall be "passive" (other nodes in that cluster with which the cluster manager is not communicating).

Upon startup, for each server in the network domain (where "domain" can be defined as a functionally-bounded subset of interconnected network components that communicate and/or cooperate with each other for a common purpose), cluster manager 258 will attempt to heartbeat one node of each server by sending a heartbeat signal to the IP address of each such node, such as, for example to SP-1 of server 202, to SP-4 of Server 203 and to SP-8 of server 204. Heartbeating is light polling and its use in the present invention is explained in detail in the Parent Application. If the heartbeat request to that node or storage processor is successful then it is designated "active". Accordingly, the peer node in server 204 and the peer nodes in each of servers 202 and 203 are designated as "passive". If an active node is down, or has failed, cluster manager 258 will send a heartbeat to another (passive) node in the cluster and designate such other node as active if the heartbeat is successful. If all nodes of a cluster are not responding, cluster manager 258 will periodically heartbeat the IP addresses of all nodes in that non-responsive cluster until a successful heartbeat request completes to one of those non-responsive nodes. The responding node will then be designated as active, and its peer node or nodes will be designated as passive.

If a server, for example server 202, has an active node, for example SP-1, the UI application in client 201 will be allowed to send requests for indications to server 202. The UI will then retrieve the states of certain objects from server 202 by way of storage processor SP-1 and insert them into an object pool software object (not shown in FIG. 2 but to be discussed in detail in connection with FIG. 3). The object pool is located in the UI and runs under the UI application. The UI application can then graphically display the states and properties of those retrieved objects in the UI window application. In this example, SP-1 is being maintained or managed by cluster manager 258. If SP-1 happens to fail cluster manager 258 shall attempt to continue operation with, or fail-over to, another node, i.e., a successor node, (to a peer node or one of the peer nodes) in cluster 255. Accordingly, cluster manager 258 would send a heartbeat request to a peer passive node, e.g., storage processor SP-2. If the heartbeat request to SP-2 is successful cluster manager 258 swaps the roles of the SP-1 and SP-2 nodes within server 202, the active node becoming passive and vice versa. When a cluster fail-over event is accomplished all requests including requests for indications that previously went to the active node are then routed to a passive node which becomes the new active node in that cluster. Since the server data for server 202 is the same regardless of which server node (SP-1, SP-2, or SP-3) responds to requests from the client's cluster manager 258, the data in the object pool object for server 202 remains the same. However, all of the observers that were registered on originally active node SP-1 before failover shall now need to be registered on the newly active node so that the UI application can continue to be notified of changes on objects for which it has subscribed. Therefore, cluster manager 258 needs to send a message to the client's indication manager (not shown in FIG. 2, but shown and described in FIG. 3) requesting that the indication manager re-send all observer requests (subscriptions for indications) for a particular node to its peer node.

Figure 3:
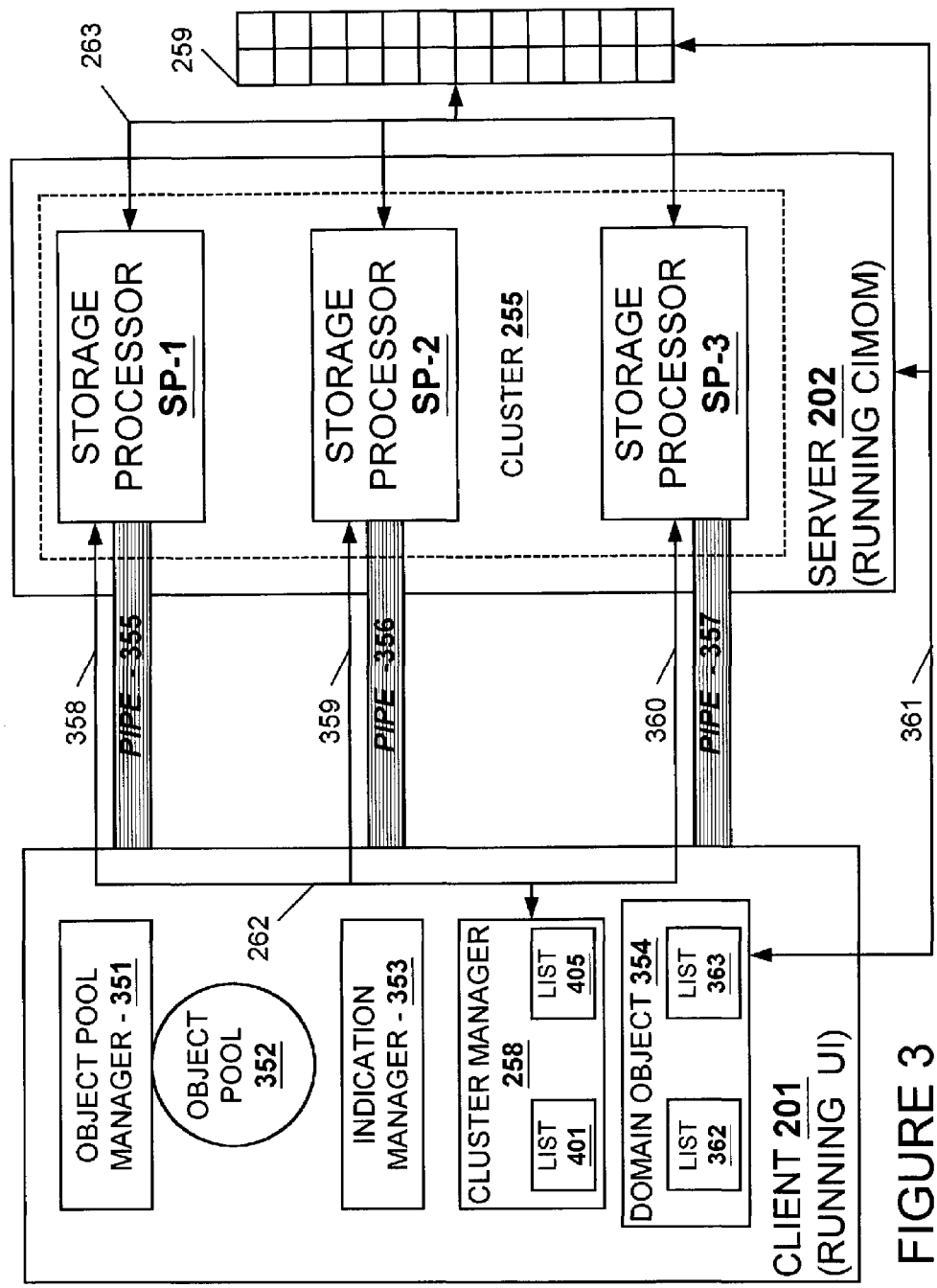
FIG. 3 is a more detailed block diagram of a portion of the client-server storage network of FIG. 2.

FIG. 3—Client-Server Storage System Detail

FIG. 3 is a more detailed block diagram of a portion of the client-server storage network of FIG. 2. Client 201 is at the left-hand side of the diagram and server 202 is at the right hand side. Cluster 255 of FIG. 2 is shown in dashed line representation within server 202, encompassing storage processors SP-1, SP-2, and SP-3. Persistent pipes 355, 356, and 357 are shown operatively coupling Client 201 with storage processors SP-1, SP-2, and SP-3, respectively. Persistent pipes are special TCP/IP connections and a detailed discussion of persistent pipes is included in the Parent Application. Server 202 is running CIMOM.

Client 201 is running User Interface UI application software on which various software objects or functionalities are operable. Software objects which are shown are: object pool manager 351, object pool 352, indication manager 353, cluster manager 258 (including its cluster list 401 and listener list 405), and domain object 354 (including its server information list 362 and listener list 363). These objects may communicate with each other by way of method calls (not shown) to be discussed below. A network link 262 from cluster manager 258 is shown to interconnect with storage processor SP-1, storage processor SP-2, and storage processor SP-3 via network links 358, 359, and 360 respectively. There is an additional link 361 shown from domain object 354 to disk array 259. And, disk array 259 is operatively coupled to storage processors SP-1, SP-2, and SP-3 via network link 263. There may be other network connections between client and server under certain operational circumstances which are not shown in FIG. 3 for purposes of enhancing clarity of illustration. For example, other client-based objects such as object pool manager 351 may communicate with server 202 via network requests as may be needed and as described hereinbelow. These shown and unshown links and connections may be established in accordance with TCP/IP protocol. The UI application may be written in JAVA®, the server CIMOM may be written in C++, and the network requests may be written in XML, but other languages could be used.

Domain Object:

Operation of cluster manager 258, as discussed in connection with FIG. 2, is dependent upon input from domain object 354. (As to be discussed hereinbelow, the various managers shown each manage a list of entries relevant to that particular manager; however, since "domain object" manages the domain and not a list of domains it is not referred to as domain manager.) Upon startup, domain object 354 initially asks the domain gateway (not shown per se, but can be a server in the domain to which the UI is currently connected, and can be one of its storage processors if that server is a storage array) for a list of servers that constitute that particular domain. Domain object 354 then communicates via link 361 over the network with server 202 and its storage processors, and then to array 259. The purpose of domain object 354 is to detect (or map) the contents of the domain. For each server identification returned, the domain object extracts that server's list of storage processors and their respective IP addresses. One cluster object is created for each server identity and the IP address of each storage processor in that cluster is added to that cluster object. Domain object 354 stores each server's cluster object in its server information list 362 which is located internal to domain object 354. When each cluster is discovered, the domain object notifies all "listeners" on its listener list 363 that may be registered for indications or events notification with this domain object. In other words, the domain object notifies all software object listeners within the user interface or application that are on that list, such as cluster manager object 258.

Domain object 354 also registers with the gateway to be notified of any changes to the domain, such as: if a new server is added to the domain; if a current member server is removed from the domain; or if the domain is destroyed; etc. When domain object 354 is notified of a new server being added to the domain, the same procedure is followed as for startup discussed above. When domain object 354 is notified that a server was removed from the domain, domain object 354 locates the entry corresponding to that server in its internal server information list 362, notifies all listeners that such cluster has been removed from the domain, and deletes that cluster from the its internal server information list 362. When domain object 354 is notified that the domain has been destroyed, it notifies the listeners in its internal listener list 363 of that destruction and clears its internal server information list 362.

As noted, one of the listeners in the internal cluster list of the domain object is cluster manager 258. When cluster manager 258 is notified via method calls (not shown) from domain object 354 of any of the events of adding a cluster, deleting a cluster or destruction of the domain, cluster manager 258 takes appropriate action with respect to its responsibility in the domain. For example, if a cluster is being added to the domain, one of the first actions taken by cluster manager 258 is initiation of heartbeating of the added cluster to identify the active storage processor node in that cluster. Such heartbeating is accomplished over links 262, 358, 359, and 360 and was discussed in detail in the Parent Application. Heartbeating and cluster manager 258 shall be further discussed in connection with FIG. 4 hereinbelow.

Figure 9:
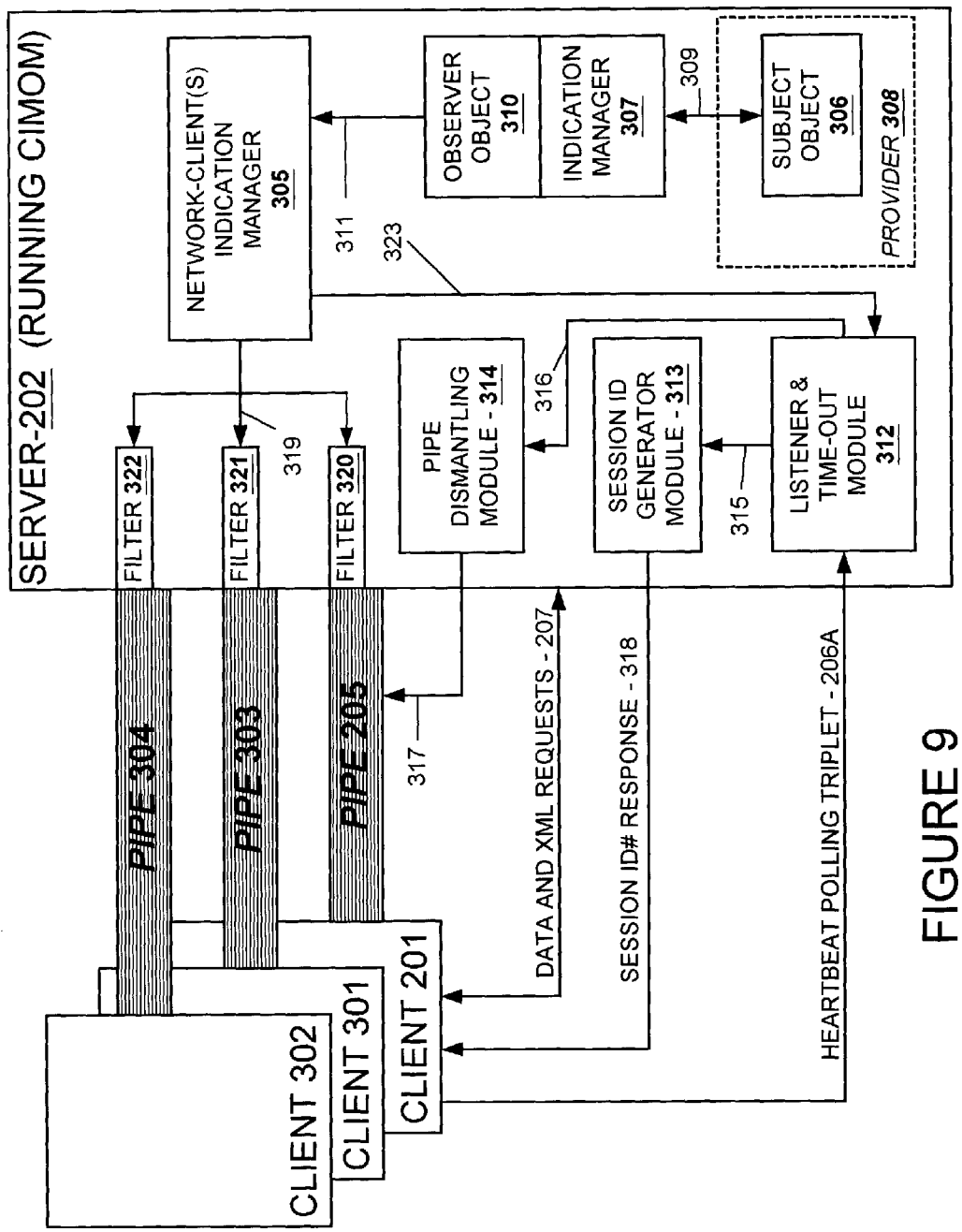
FIG. 9 is another block diagram of a client server network which is useful in discussing client failure mode handling aspects of the present invention; and, FIG. 10 is a flowchart depicting steps undertaken by the present invention during client failure mode.

Indication Manager:

Indication manager 353 located in client 201 is conceptually identical to indication manager 305 in the server in FIG. 3 of the Parent Application (the same server indication manager 305 appears in FIG. 9 herein). However, UI indication manager 353 performs additional observer maintenance. For example, as an observer is registered on a server object, (as client 201 subscribes for an indication on a particular server object), indication manager 353 makes an entry in its observer table (not shown) to track that server object and certain of its properties for which the observer is registered and the client has subscribed (about which the client has interest). In the event of fail-over to a successor peer storage processor that had previously been a passive node in a particular server, cluster manager 258 sends a message to indication manager 353 to re-subscribe all observers for that particular server.

For example, assume that SP-1 is the active node which is being used to process subscriptions for indications on particular objects in server 202. Also assume that SP-1 fails and SP-2 is made the new or successor active node resulting from the fail-over process to be further described. Then cluster manager 258 shall send a message to indication manager 353 (via method calls—not shown—running on the UI application) to resubscribe all previously subscribed observers in server 202 to SP-2 that were being processed through SP-1 before it failed. Responsive to that message, indication manager 353 shall iterate through its observer table and re-send to SP-2 the same observer requests it had earlier sent to SP-1 for those particular objects in server 202. Accordingly these requests will be routed to new active node storage processor SP-2 which shall process these requests and thereby register these observers on the server node.

In other words, a task of indication manager object 353 is to maintain a list of observers that are placed on Common Information Model (CIM) objects (not shown in this Fig.) in server 202 by various UI components such as dialogs. Dialogs are the questions presented to a human user on the terminal screen of a workstation to allow human interaction with the domain. Since a software object may have a list of properties, an observer object may be placed on a particular property in that list responsive to another object's interest in knowing when the value of that particular property has changed. The three components of an observer object include the subject object (the object being observed), the particular property or properties of the subject object to watch, and a callback function (scheme for notifying the object that was interested in the change in the subject object). Whenever a user (e.g. a dialog in client 201) of a CIM object (a subject object in server 202) requests that an observer be placed on the subject object and its properties, indication manager 353 is invoked.

On the one hand, if a previous observer had been registered on the same subject object and the same particular property or properties, indication manager object 353 merely places the callback in a list of callbacks for that object property pair. That list of callbacks is located in indication manager 353. This avoids unnecessary network calls, thus providing a better response time. On the other hand, if a previous observer had not been registered on the same subject object, etc., then the subject object, the particular property or properties and the callback are saved in a table in the indication manager and a network call to the server is made.

Indication manager 353 is notified that an observer in server 202 has fired and has generated an indication when the server makes a network call to client 201 indicating that a CIM object and its property has changed. Indication manager 353 finds that CIM object in its observer table and determines if the properties specified in the observer firing are contained in the list of properties saved in the table for that CIM object. If so, then the callbacks for that CIM object with those particular properties are invoked.

The listener list in cluster manager 258 includes indication manager 353 as one of its listeners. When indication manager 353 is notified by cluster manager 258 that a storage processor has failed over to another (successor) storage processor in its cluster, indication manager 353 finds all CIM objects in that cluster's server that were previously registered for indications, and then re-registers all of the observers for those CIM objects on the successor storage processor. Cluster manager 258 had already accomplished the selection of the next active (successor) storage processor when it notifies listeners on its listener list of the failover event. There is no requirement upon indication manager 353 to know which previously passive storage processor is made active in order to register observers. Indication manager 353 simply registers observers on any storage processor to which it is directed by the cluster manager.

Object Pool Manager and Object Pool

Object pool manager 351 is a software object which maintains a pool of objects along with certain of their properties, that have been retrieved (objects for which indications have been subscribed) from one or more servers or CIMOMs such as server 202. As client 201 subscribes to indications on objects in, or requests objects from, server 202, for example, LUNs or disks, those objects along with certain of their properties are placed into object pool 352. The UI software application always has a reference to an object stored in object pool 352 so that all threads within the UI application can reference the same instance of a particular object. (A thread is another process or application that runs alongside the main UI application and has a specialized and repetitive task to accomplish—more about threads will be provided hereinbelow.) When client 201 receives an indication from server 202, for example, an indication that is fired over persistent pipe 355 from SP-1, the client's indication manager 353 essentially has retrieved a newer copy of an object previously-stored in object pool 352. Then, object pool manager 351 updates the properties of the previously-stored object in the pool. Communication between indication manager 353 and object pool manager 351 is accomplished via method calls running under the UI application. By updating the properties of a previously stored object in object pool 352, rather than removing and placing a new copy of that object into the pool, UI threads that have a reference to that object shall now have a reference to that object with updated properties. The various UI threads that have a reference to that object with updated properties shall be notified of those updated properties via an observer (not shown) if they are registered on any of the properties that have changed.

If a failover event occurs, indication manager 353 instructs object pool manager 351 via a method call to fetch updated values (if any) of properties of the objects stored in its pool. Object pool manager 351 sends a network request to server 202 to employ its observer infrastructure to retrieve copies of values of the properties of all of the objects currently maintained in object pool 352. These values are forwarded to indication manager 353 where a comparison is made between values of the properties before and after the failover event. If any of the properties have different values after the failover event from values of those same properties prior to the failover event, then indication manager 353 itself generates an indication for the object/properties that have changed. Indication manager 353 then proceeds to function as if the indication had been received over network link 262 from server 202 in the usual manner.

Figure 4:
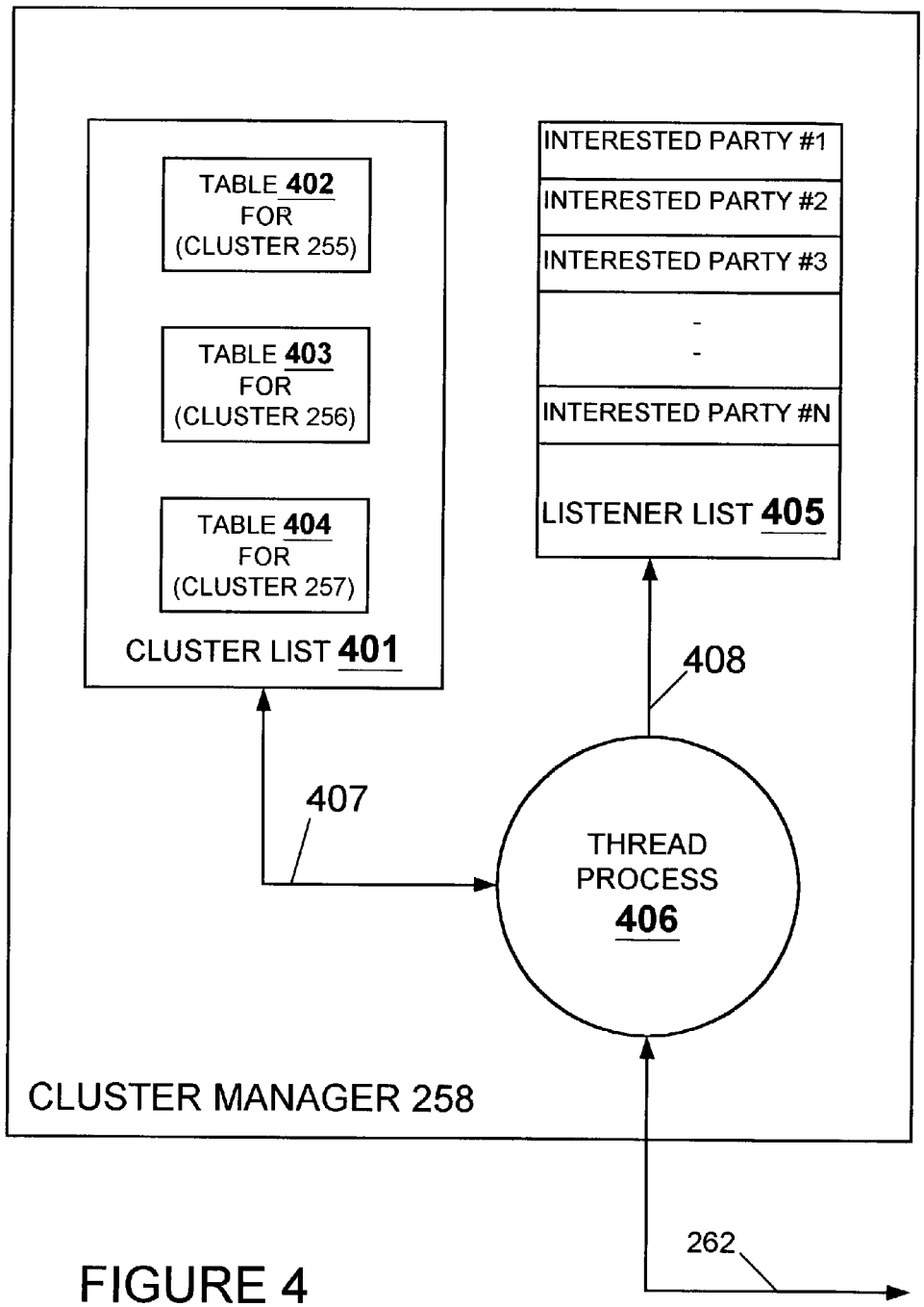
FIG. 4 is a block diagram of the cluster manager depicted in FIG. 3.

FIG. 4—Cluster Manager

FIG. 4 is a block diagram of cluster manager software object 258 depicted in FIG. 3. Cluster manager 258 contains various software functionalities including cluster list 401 which the cluster manager has constructed, listener list 405, and thread process 406. Thread process 406 communicates with storage processors SP-1, SP-2, and SP-3 in server 202 over TCP/IP (or its equivalent) link 262, and communicates internally with cluster list 401 and listener list 405 via method calls 407 and 408 respectively running on the UI application. Cluster list 401 is a list of cluster manager tables 402, 403, and 404 for clusters 255, 256 and 257 respectively. In other words, each server in client server network 200 may have its own set of storage processors of varying number as shown in FIG. 2, and each set of storage processors may be incorporated into a cluster of such storage processors. Each such server's cluster is then listed as a table in cluster list 401, the table containing information about the storage processors in that respective server. That information includes IP address and individual processor state information, which shall be discussed in more detail in connection with FIGS. 5 and 6.

Listener list 405 may include names of software objects within the network (and IP addresses of those objects if running in process space other than the UI application process space) which have an interest in the status of any one or more of the clusters listed as tables in cluster list 401. Listener list 405 shows entries of "interested party #1" through "interested party #N". Interested party #1 may be, for example, indication manager software object 353. Cluster manager 258 is thus performing in the role of a service when it fires indications to the interested parties in listener list 405 when the state of cluster manager 258 changes as reflected by a change in any one of the states of the tables in cluster list 401.

Thread process 406 is related solely to the heartbeating task to which reference was made earlier herein. As noted, a thread is a process which is set off to the side of the main program or application and is normally a specialized and continuous loop which is used to handle a specific and repetitive problem. The thread may run virtually independently of the main code. In effect, the thread runs virtually concurrently with the running of the main code, although if only one central processing unit (CPU) is running in the client, then there may be some time sharing required between the main program and the thread. The thread shall continue to execute its code until something happens to make it stop. An advantage to using a thread is that if there is a piece of code that is repetitive and takes a long time to execute, for example the heartbeating code, the main application need not stop running while the thread is executing. Thus, if there are one minute intervals between heartbeats, for example, at the start of the thread's loop the one minute interval is first concluded before the heartbeat is performed and processed. Then the procedure returns to the top of the loop and waits for another minute before performing the next heartbeat, etc.

In this case, thread process 406 "goes over the wire" via link 262 and makes a heartbeat request in XML language to the CIMOM in server 202, to determine if the last-selected active storage processor in cluster 255 is still operative. As in a prior example, if SP-1 is the last-selected active node which had been operative but fails at some point, then the heartbeat request from thread process 406 shall detect such failure over link 262. [For a detailed description of heartbeating, as it is used in the present invention, refer to FIGS. 7A and 7B in the Parent Application.] The heartbeat request is directed to a specific storage processor (to its specific IP address), and in this case is directed to SP-1. In the interests of efficiency, under conditions where a storage processor is active and operative, thread 406 causes a heartbeat request to be made to only that active (or what the thread had believed was an active) processor in cluster 255. Since SP-1 has failed, however, that detected failure causes thread 406 to heartbeat passive node SP-2 to determine if it is operative, and if not to thereafter heartbeat passive node SP-3 to determine if it is operative. If SP-2 or SP-3 are operative, the first operative node which is heartbeat becomes the successor node to failed node SP-1. If neither are operative, then SP-1, SP-2, and SP-3 are all repetitively and sequentially heartbeat until one returns to operability. When SP-1 fails, if its peer node SP-2 is operative, then SP-2 is its successor, and this state change is communicated via method call 407 from thread process 406 to table 402 in cluster list 401. Additionally, any interested party in listener list 405, such as indication manager 353 is notified by thread process 406 via method call 408 of the state or status change of cluster manager 258 as reflected in the change in table 402. More about this procedure shall be discussed in connection with FIGS. 5 and 6.

FIG. 4 (Continued) and FIGS. 5 & 6—Cluster Manager Table

FIG. 5 depicts software-construct table 402 for cluster 255 of server 202, the table being contained within cluster list 401 and having entries that reflect the status of cluster manager 258 before a failover event occurs. The headings of the table are: Cluster Number, Storage Processor Node, Functional State, and Operative State. Functional State relates to the node's functioning as either an active or a passive node. Operative State relates to the node's operability—the node is either "up" or "down". Under the Cluster Number heading, cluster 255 is entered corresponding to each storage processor. Under the Storage Processor Node heading, IP addresses of each storage processor: SP-1, SP-2, and SP-3 are entered. These are different IP addresses for each storage processor although they are all located in the same server. Under the Functional State heading, the entry for SP-1 is "active", meaning that this is the storage processor which is being used to process requests for indications from the server—the storage processor that has been chosen to interact with the server's indication manager, observer infrastructure, filters and persistent pipe(s) connecting server and client (all shown in FIG. 9 herein and discussed in connection with FIG. 3 of the Parent Application). Under the Functional State heading the entries for SP-2 and SP-3 are "passive", meaning that these storage processors are not being used to process indications from the server (although these passive storage processors may be fully functional in processing commands, data, etc. on behalf of other non-indication performance requirements in the domain). Finally, under the Operative State heading, all storage processors are operative (none are down).

FIG. 6 is the same table 402 for cluster 255 of server 202, but now having entries that reflect the status of cluster manager 258 after a failover event has completed. Under the Cluster Number heading the entries have not changed. Under the Storage Process Node heading the entries have not changed. However, under the Functional State heading, the storage processor SP-1 entry is now "passive" and the storage processor SP-2 entry is now "active". The roles of these two storage processors have been reversed, and SP-2 is now the successor storage processor to SP-1 that has been chosen by way of the failover process to interact with the server's above-noted indication manager, observer infrastructure, filters and persistent pipe(s) connecting server and client. Under the Operative State heading, SP-1 is shown as "failed" and the other two processors are shown as operative.

As noted, there is one cluster manager table for each cluster, and one cluster for each server. Accordingly, there are similar entries of storage processor information or data for each storage processor in each cluster in the domain. As thread process 406 "cruises" through the list of cluster tables, it notes one active and operative processor per table as reflected in FIG. 5 which it "pings" by way of the heartbeat process. If the heartbeat process returns a "failed" condition with respect to any one of the previously entered active and operative storage processors, thread process 406 immediately initiates the failover operation for that failed storage processor by immediately pinging or heartbeating another storage processor node, or if necessary other storage processor nodes, in that cluster. This pinging or heartbeating is continued until another operative node in that cluster is determined as the successor node, thereby achieving failover to the successor node. The first other storage processor node that is determined to be operative is the successor node. The failover event is reflected in FIG. 6 as a change in status in a table in cluster list 401 (explained in more detail below), thus creating a state change in cluster manager 258. Thread process 406 then fires to listener list 405 to advise all interested parties of the new state of cluster manager 258. Also as noted, when cluster manager 258 is advised by domain object 354 of a new cluster in the domain, cluster manager 258 adds it to cluster list 401; when cluster manager 258 is advised by domain object 354 of the removal of a cluster from the domain, cluster manager 258 removes it from cluster list 401; and, when cluster manager 258 is advised by domain object 354 of the destruction of the domain, cluster manager 258 destroys cluster list 401.

FIG. 7—Object Pool Manager Table

FIG. 7 depicts a table which is a software construct within object pool manager 351. As earlier noted, object pool manager 351 is a software object which maintains or oversees a pool of objects along with certain of their properties in this table. There are two table headings: Instance Name and Observer Property Object. The instance name is used to identify an object—what it is and where it is located. For example, under the heading Instance Name "XXX_LUN0" is the first entry in the table and is the instance name of logical unit zero and carries with it sufficient information to identify what it is and where it is located. The designation "XXX" is intended to represent part of the CIM instance name and includes the location of the CIMOM and the key properties that uniquely identify the instance within the CIMOM. The IP addresses for LUN0, LUN1 and LUN2 can be the same as, or different from, each other. Observer property object also serves more than one purpose.

First, observer property object can supply a subset of all properties available to a particular object, thereby functioning as a filter and avoiding indications of state changes for that particular object with respect to its properties outside of the subset. There may be properties in a LUN object, for example, that change frequently, even between every successive poll or heartbeat, that are not of interest. Each such change, without such filtering, would cause a firing of an indication over the persistent pipe for no good reason. For example, corresponding to LUN0, "Fault Status" is a subset of properties associated with LUN0, is the only property of interest with respect to LUN0 in this example, and is the only property of LUN0 for which a change in its status causes an indication activity within client 201.

Second, observer property object also relates to the "callback" function. As noted, there are interested parties in the domain which are software objects which want to be notified if and when certain properties of certain other objects of interest to them change state. For example, certain interested parties are shown as entries in listener list 405 in cluster manager 258. Also, there may be other entities that want to be notified when a subject object such as LUN0 changes state: for example, there may be a dialog such as "bind or create LUN" or a tree display on the terminal screen that wants to be notified when LUN0 changes state. All of these various interested entities essentially supply an address by which they can be notified, and this address is included within a callback function or "funcC" and stored in the observer property object. These callbacks are designated in FIG. 7 as funcC1, funcC2 and funcC3 to indicate that the callbacks are made to three different memory locations. The callback function associated with each entry in the table of FIG. 7 identifies which entity or entities need to be notified when particular properties associated with the object in the pool corresponding to that entry changes state.

As noted, LUN0 may be an object of interest to multiple functionalities or entities within the client for different reasons. This callback function allows each of these multiple entities to obtain what it is interested in by reading a copy of that LUN0. Accordingly, this object pool scheme allows identification of that LUN0 object in a manner that permits all interested entities to point to the same copy of that object in the object pool and thereby provides a way for each such entity to be notified when LUN0 changes.

The object pool contains the most recently updated versions of copies of all subject objects for which indications have been subscribed in the various servers in the domain. Accordingly, if and when an active storage processor fails, for example in server 202, as earlier noted, indication manager 353 instructs object pool manager 351 via a method call to fetch updated values (if any) of properties of the objects stored in its pool. Object pool manager 351 sends a network request to server 202 to employ its observer infrastructure to retrieve copies of values of the properties of all of the objects currently maintained in object pool 352. These values are forwarded to indication manager 353 where a comparison is made between values of the properties before and after the failover event. If any of the properties have different values after the failover event compared with values of those same properties prior to the failover event, then indication manager 353 itself generates an indication for the object/properties that have changed. Indication manager 353 then proceeds to function as if the indication had been received over network link 262 from server 202 in the usual manner. In this manner, the client ensures that the successor processor can seamlessly process subsequent indications upon occurrence of further state changes in various subject objects running on CIMOM within server 202.

Figure 8B:
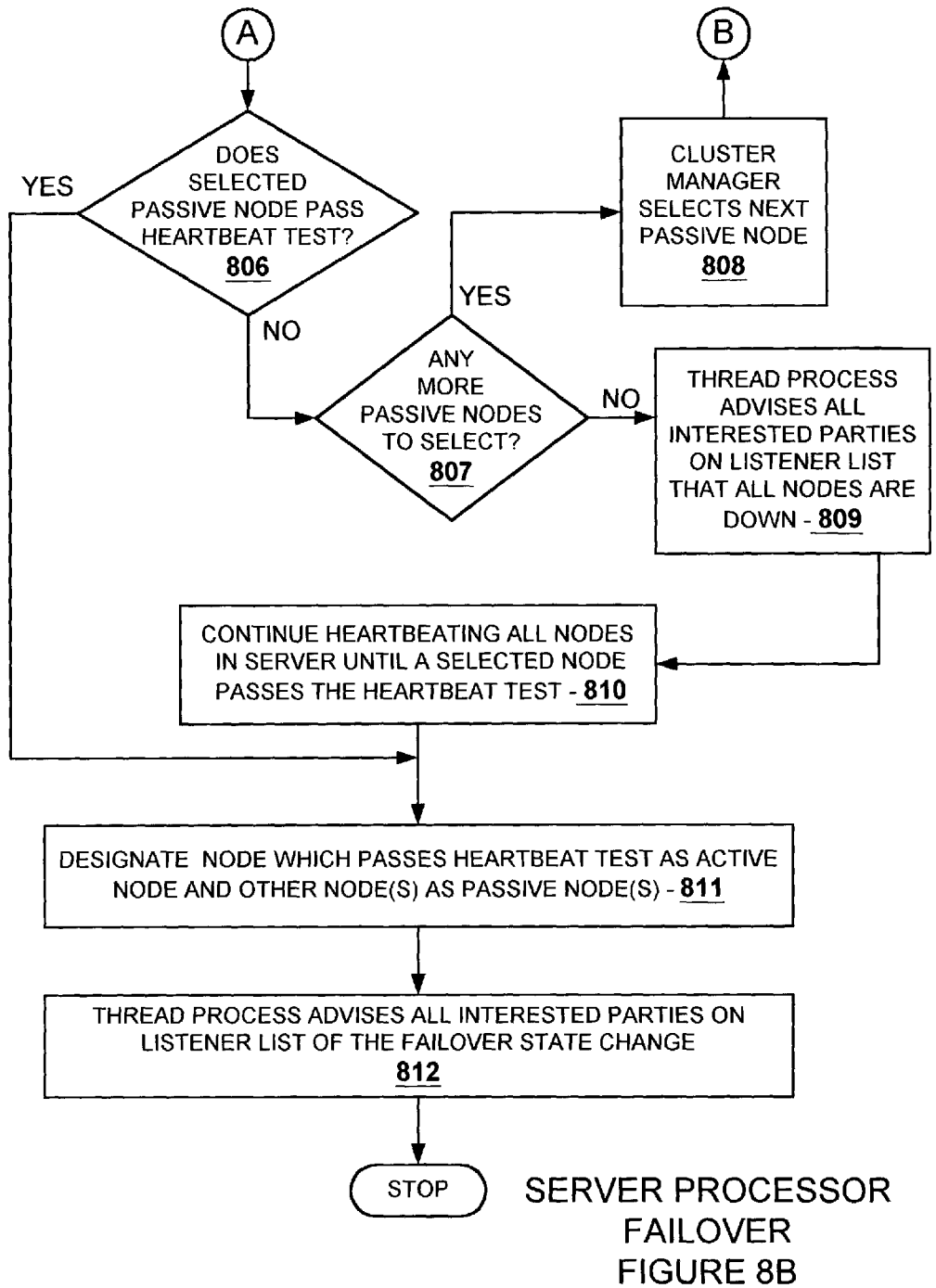

FIGS. 8A and 8B—Server Storage Processor Failover Flowcharts

FIGS. 8A and 8B are inter-related flowcharts depicting steps or tasks undertaken by the present invention during a server storage processor failover operation. In task 801 a cluster manager software object located in the client of a client-server network is running under the user interface software application that runs on the client. The cluster manager communicates with the server and periodically heartbeats the active node in the server. This is a quiescent state of operation, and if there is no failure or noticeable performance degradation of the active node, then this state of operation may continue indefinitely. In query task 802 the question is posed: does the cluster manager detect that the persistent pipe to the active node is disconnected? The cluster manager can detect a pipe disconnection if the cluster manager receives a TCP/IP message indicating that the TCP/IP connection has been reset or that the server has no more data to send. The cluster manager can also detect a pipe disconnection if the "send" of the heartbeat message fails which may imply that the persistent pipe is down. Additionally, the cluster manager can detect a pipe disconnection if the session ID # changes in the heartbeat response (which means that a new instance of the active node is running) and the cluster manager was not notified via a TCP/IP Reset signal, thereby implying a broken pipe. If the answer is "no", the algorithmic process moves to query task 803 which poses another question: does the cluster manager detect that the active node has failed in response to heartbeat polling? If the answer is "no", the algorithmic process returns to task 801 and remains in the above-noted quiescent state.

However, if the answer to the question posed in query task 803 is "yes", where an active node or storage processor failure in the server is detected by heartbeating, then the process moves to task 804 where the cluster manager selects a passive node in the server as a potential successor or failover node. Likewise, if the answer to the question posed in query task 802 is "yes", where the persistent pipe to the active node is disconnected, then the process also moves to task 804 where the cluster manager selects a passive node in the server as a potential failover node. For example, in FIG. 3 persistent pipe 355 is dedicated to storage processor SP-1; if pipe 355 fails, this failure is a functional equivalent to failure of SP-1, at least with regard to firing back indications from server to client. If SP-2 is selected as a potential failover or successor node, it shall operate through a different permanent pipe 356 which is independent from failed pipe 355. Each storage processor may have its own dedicated and independent permanent pipe.

The algorithmic process then moves to task 805 wherein the cluster manager heartbeats the selected passive node and thereafter moves via tab "A" to query task 806 wherein the question is posed: does the selected passive node pass the heartbeat test? In the heartbeat test, the client's cluster manager sends a "triplet" (see the Parent Application for explanation of triplet) over a TCP/IP link to the server's selected passive node and awaits an immediate response over that link to indicate that such node is operative. If the answer to the question is "no", query task 807 poses the next question: are there any more passive nodes to select? If the answer to that next question is "yes", then in task 808 the cluster manager selects the next passive node in the server and returns to task 805 via tab "B" wherein the cluster manager heartbeats the next selected passive node. For example, in server 202, if SP-2 did not pass the heartbeat test, then SP-3 would be selected for heartbeating by cluster manager 258. But, if the answer to the question posed in query task 807 is "no", there are no more passive nodes to select. Then, in task 809 a thread process running on the cluster manager advises all interested parties on the cluster manager's listener list that all nodes (all storage processors in the server of interest), both the formerly active node and the remaining passive nodes, are inoperative. Thereafter, in task 810, the cluster manager continues to heartbeat all nodes in the server until a selected node passes the heartbeat test. This would entail heartbeating each storage processor node in repetitive sequence, e.g. if SP-2 was the formerly active node and is now inoperative, and if SP-3 is an inoperative passive node, then the repetitive sequence could be: first SP-1, then SP-2, then SP-3, and then SP-1 again, etc. until one of the nodes passes the heartbeat test. From task 810, the algorithmic process moves to task 811 wherein the node which passed the heartbeat test is designated as active and the other nodes are designated as passive. Returning to query task 806, if the answer to the question posed was "yes" where the selected passive node does pass the heartbeat test, then the algorithmic process likewise moves to task 811 wherein the node which passed the heartbeat test is designated as active and the other nodes are designated as passive. Thereafter, in task 812, a thread process in the cluster manager advises all interested parties on the listener list of the failover state change and the process concludes.

Recapitulation of Failover Operation:

Within the context of a fault tolerant non-cluster node pair, which is two nodes that provide independent access to the same data, the server nodes are tightly coupled but do not export a single interface to clients. The two nodes do not share a common IP address and both have unique unrelated IP addresses. Client applications "see" the nodes as independent nodes and must implicitly determine the relationship of the nodes. The node pair may consist of two storage processors resident in the same array chassis. The data may be EMC Corporation's CLARiiON® storage management data, used by its Navisphere® software to monitor and configure the properties of the disk array. The present invention thus provides a protocol between client and server that allows for indication processing to continue uninterrupted if failure of a single storage processor server node occurs.

Heartbeating and the session ID protocol as described in the Parent Application provide a means by which a client may determine if a server is unreachable or has recycled. The cluster manager software process stores the state of each server, each of which shall have at least two nodes, the operating state of each node being good or bad. The cluster manager designates an active node on startup of the application and all requests and indication subscriptions are sent to the active node. If a heartbeat request indicates that a node has failed, the cluster manager will set the active node status to bad, change the active node to passive and the formerly passive node (if operative) to active. The cluster manager shall then re-issue all indication subscriptions to the new active node and all requests shall now be sent to the new active node. The UI application does not need to be aware of a single node failure because request and indication processing proceed without interruption.

A graphical management application such as EMC Corporation's Navisphere 6.0 can utilize the automatic fail-over of indications to provide continuous display of the state and data associated with disk arrays that are being managed without doing a fill poll of all nodes. On startup of the Navisphere UI, the cluster manager shall "talk" to a single node of a node pair and subscribe for needed indications. As the state and data changes on the array the Navisphere UI is notified by the firing back (using observers) of an asynchronous indication. If the active node goes down, then the fail-over described above occurs, and the cluster manager will re-subscribe for all indications to the new active node (if operative). The Navisphere UI continues to display the state and data associated with the disk array even though the node originally contacted is unreachable. The UI application does not have to deal with the failure of the single node because the cluster manager handles the fail-over of indications. This is useful in the event of node failure, cable failure, or for planned node down time such as upgrading software. The human end-user of the UI application does not have to re-start the UI application or point the UI application to the address of the peer node. The UI continues to display the current state of the disk array.

FIG. 9—Multiple Client-Server Block Diagram

Thus far, most of the explanation of the present invention has related to the handling of server-related failure with regard to the processing of indications in a client-server network environment. However, the client may likewise suffer a temporary or permanent failure which shall likewise impact the processing of indications. FIG. 9 is another block diagram of a client-server network depicting multiple clients including client 201 and a detailed portion of server 202. FIG. 9 shows certain software object functionality relating to the activity of indication subscription within server 202 and serves to illustrate certain aspects of the present invention in connection with a discussion of client-related failure.

In the upper left of FIG. 9, three clients are now shown: clients 201, 301, and 302. They are communicatively connected by pipes 205, 303, and 304 respectively to server 202 at the right side of the diagram. If connections at the server side and the client side of these pipes are made in accordance with the "persistent pipe connection protocol" described in the Parent Application, then these pipes are also made persistent. Otherwise, if the ports are not bound, or the protocol is not otherwise followed, then these pipes may represent ordinary TCP/IP connections. Indications can be fired-back over non-persistent pipes, but such an asynchronous notification scheme runs the risk of failed communication. Client 201 is also shown as being communicatively connected to server 202 via data and XML requests bidirectional link 207. Client 201 is further communicatively connected to server 202 via heartbeat polling triplet link 206A and session ID # response link 318. Clients 301 and 302 may also be communicatively connected in a similar manner, but such connections are not shown to enhance clarity of presentation.

Indication Processing:

With respect to indication processing functionality, in the lower right-hand corner of server 202, subject object 306 is depicted as a generic software object and may be, for example, a LUN object. Subject object 306 is shown "packaged" within provider 308. Other providers (not shown) may package other kinds of objects such as user account objects. Subject object 306 is communicatively coupled via bi-directional link 309 to indication manager block 307. An indication manager is a software module that processes indications and is functionally positioned between any client and server that wants to exchange indications. Block 307 is depicted as abutting observer object 310 and is thus intended to depict an operative coupling to its observer object 310. Observer object 310 is also operatively coupled over link 311 to network client(s) indication manager 305 which is operatively coupled via link 319 to filters 320, 321, and 322. These filters are operatively coupled respectively to pipes 205, 303, and 304. (Software functionality shown in server 202 is manifested within one process whereby each operative coupling is actually a method call within this same process. One object is invoking a method on another object which accomplishes the operative coupling. The links and the abutting functionality shown are thus method call representations.)

In operation, after client 201 and server 202 establish their pipe connection as described in the Parent Application, client 201 subscribes to certain indications in server 202. In other words, client 201 requests that certain objects of interest to that client provide indications about when each of those certain objects has a state change. This subscription, or registration for indication, operation is processed in extensible markup language (XML). A state change can be a failure, a degradation, an addition or deletion of a quantity to or from an object, etc. For example, if client 201 had subscribed to an indication for subject object 306, then in the graphical user interface or GUI (not shown) associated with client 201 an icon is displayed on the terminal screen corresponding to subject object 306. If subject object 306 is, for example, a LUN, and if there is no fault with that LUN, the icon would typically be gray color. But, if there is a fault with that LUN the icon is supposed to have changed on the terminal screen to another color, typically red. This change in color would signal to the user that there is a fault in that LUN. In order to achieve this communication with the client's GUI, the following operation is undertaken.

Indication manager 307 is focused on, or attuned-to the filter settings of, LUN object 306, although indication manager 307 could also simultaneously be focused on other objects (not shown). At the moment that LUN object 306 changes state, for example, changes from faultless to faulted state, indication manager 307 processes that state change indication. Indication manager 307 has a lookup table (not shown) to which it refers and will find all clients in its table that are interested in this state change. Indication manager 307, in this instance, may find only companion observer object 310 in its table and which happens to be interested in that state change. Observer object 310 via indication manager 307 notes that this LUN's property "IS FAULTED" has changed from "false" to "true" indicating a fault. Observer object 310 and indication manager 307, running under the CIMOM which is running on server 202, thereby inherently advise the CIMOM that IS FAULTED has changed for LUN object 306. Network-client(s) indication manager 305, as well as all other functionality shown in server 202, are also running under the CIMOM. Therefore, indication manager 305, acting as client to the provider-server (not shown) containing observer object 310, receives the IS FAULTED indication of the state of LUN 306 via link 311 (as a method call). As noted, indication manager 305, observer object 310 within its unshown provider, indication manager 307, and provider 308 including LUN 306 all run in the same process space as the CIMOM and therefore do not have to do any special networking therebetween, as compared with, for example, the networking required between client 201 and server 202.

Network-client(s) indication manager 305 is part of an indication infrastructure that essentially serves network clients such as 201, 301 and 302. As noted above, indication manager 305 is aware of the state change which occurred in subject object LUN 306 and, therefore, applies the IS FAULTED property to each of three indication filters 320, 321, and 322. Each of these filters reflects interest by its respective client in only particular indications. On the one hand, for example, if filters 321 and 322 reflect no interest by clients 301 and 302 respectively in state changes in LUN 306, then filters 321 and 322 prevent the firing back of such state change indications over pipes 303 and 304 respectively. On the other hand, if filter 320 does reflect interest by its client 201 in state changes in LUN 306, then it allows the firing back of such state change indication over pipe 205 to client 201. Accordingly, after processing this indication in the code in client 201, the LUN 306 icon on the user interface (not shown) associated with client 201 will turn from gray to red indicating a fault.

The property "IS FAULTED" is a property of the LUN object and may be implemented in virtually any high level programming language. Code for server 202 is written in C++. Other object oriented programming languages could have been used, such as JAVA®. Similarly, JAVA is used to write the code for client 201, where other languages such as C++ could have been used in the client. JAVA was selected for the client because it is portable where it can be used across different platforms. The client may operate on one of several platforms such as, for example, a UNIX® or WINDOWS NT® platform. JAVA provides an advantage since the code need not be rewritten when moving from one platform to another. Also, JAVA is a language in which code can be written relatively quickly. C++ was selected for the server because it requires relatively fewer resources than other high level languages such as JAVA and therefore it permits conservation of resources in the server.

Heartbeating:

Client 201 generates a periodic polling triplet identifier at intervals which are settable by the user or client. These intervals are set to be relatively long, so the polling traffic is kept to a minimum, the polling thereby being termed "light polling" or "heartbeating". This triplet identifier is the same identifier established by the client when the special TCP/IP connection was being established. As noted, this triplet identifier comprises (1) Client's TCP/IP address; (2) bound port number; (3) time stamp session identifier. The TCP/IP address is the local IP address of the workstation or the client on which the application is running. The bound port is obtained by requesting permission from the operating system to have exclusive control over a particular port; thus if there are two instances of the client application that are running on the same machine, only one instance can be associated with this bound port and the other instance must operate through a different port number. The time stamp identifier can be a Greenwich mean time 32 bit number of seconds, or some other scheme that always permits a sufficiently unique session identification number (ID#) to ensure that two session ID#'s will not be the same at any instant.

Listener and time-out module 312 receives heartbeat polling triplet 206A from client 201. There is a re-settable timing scheme (not shown) in module 312. If the triplet does not arrive on a timely basis, sufficiently early, then the scheme times-out. Thereafter, server 202, through operation of its CIMOM, assumes or concludes that client 201 has malfunctioned or failed, because under normal conditions of operation of client 201, such heartbeat would be steady and on time. Destruction of retained client information is initiated to preserve server resources. Accordingly, a client data destruction signal is forwarded over connection 323 from indication manager 305 to module 312 to initiate pipe dismantling, whereupon module 312 notifies pipe dismantling module 314 over link 316. Thereafter, module 314 does what is required to dismantle pipe 205 via link 317. As noted, this dismantling operation is undertaken by server 202 to preserve its resources. If server 202 concludes that client 201 has failed, then there is no point in server 202 putting any resources into maintaining communication pipe 205 to a failed client. In addition, any other resources in server 202 that may have been dedicated to serving client 201, such as all notification subscriptions from client 201 which are in the subscription data base of server 202, are also destroyed.

However, if the heartbeat polling triplet does arrive on a timely basis, the timing scheme in module 312 is reset. This means that client 201 is operational and this operational client status is communicated to server 202 and over link 315 to session ID# generator module 313. Module 313, in response to arrival of that heartbeat communication, supplies a server session ID# to client 201 over link 318. If the server was continuously operating, without any brief power interruption or other type of failure, the session ID# shall be the same number which was returned to client 201 when pipe 205 was established (see discussion in Parent Application). But, if the server failed and returned, even between heartbeats, its session ID# shall necessarily change. Thus, a changed session ID number signifies a server failure. Client 201 had stored the session ID# for server 202 when pipe 205 was established, and client 201 can thus detect if the server failed by comparing server ID#'s. If there was a failure, client 201 can destroy all resources earlier dedicated to server 202, can re-establish the permanent connection, and can then re-subscribe to all of the indications to which it had earlier subscribed if still interested in them. This heartbeating activity thus saves wasted resources by the client and also avoids erroneous client server operation in processing otherwise undetected erroneous indications.

Furthermore, since the triplet contains the session ID# of client 201, which changes every time the client has a momentary power failure or other interruption, this also allows server 202 to detect client failures over and above client failures suggested by time-out action of module 312. Server 202 had earlier stored the session ID# for client 201 which was forwarded with the initial triplet from client 201 when server 202 was first contacted to establish a persistent connection (see discussion in connection with FIG. 2 of Parent Application). Even if the connection was not persistent, client 201 would have sent its IP address bound port number, and its session ID# to establish a connection. In either case, server 202 can now compare the client ID# included in the most recently received heartbeat triplet from client 201 with the earlier stored client ID#. If they match then the client has not failed, but if they do not match then the client has experienced an otherwise undetected failure. If there is a mismatch, then server 202 destroys all resources that it had dedicated to client 201, including dismantling pipe 205 via link 317. Server 202 is then ready for, or receptive to, communication from any client that may wish to be served by server 202 including client 201 which may revive and re-subscribe to indications. Therefore, server 202 is ready for a subscription to indications by a new client, or is prepared to receive further subscription to further indications by other previously connected clients, such as clients 301 or 302 which are shown connected to server 202 via pipes 303 and 304 respectively.

FIG. 10—Client Failure Mode Flowchart

FIG. 10 is a flowchart depicting operation of the present invention with regard to handling client failures. In task 1001, a server-based indication manager is running under the server's CIMOM and is communicating with its client in quiescent or steady-state operation. For example, in FIG. 9, indication manager 305 is depicted as running under the CIMOM of server 202 and communicating with at least client 201. In query task 1002 the question is posed: does the indication manager detect that the persistent pipe to the client is disconnected? For example, does indication manager 305 detect that persistent pipe 205 is disconnected between client 201 and server 202? If the answer is "no" the algorithmic process moves to query task 1003 wherein the question is posed: does failure occur when the indication manager attempts to send or fire an indication to the client? For example, for a state change in subject object 306 to which client 201 has subscribed for indications, does failure occur when indication manager 305 attempts to fire an indication of that state change through filter 320 over pipe 205 to client 201? If the answer is "no", then both the client and connections to the client have not failed, the algorithmic process returns to task 1001, and the steady state operation continues.

However, if the answer to the question posed in task 1003 is "yes", or if the answer to the question posed in task 1002 is "yes", then the algorithmic process moves to task 1004 wherein the indication manager finds and removes all indication subscriptions made by the client that reside in the CIMOM and in the server's providers. In other words, when there is either a persistent pipe disconnect (task 1002) or if there is a client failure (task 1003), the indication manager finds and removes all indication subscriptions as noted. For example, in FIG. 9, if pipe 205 disconnects, or if server 202 fails, indication manager 305 finds and removes all indication subscriptions registered by client 201 that reside in the server's CIMOM and in the server's providers such as provider 308. This removal operation is undertaken to preserve the resources of server 202, since there is no need to dedicate server resources to the task of firing back indications when they will not be received by the client because of either or both of these failures. Finally, the algorithmic procedure moves to task 1005 wherein the server removes the persistent connection to the disconnected or failed client from the list of connections to be monitored, and the server destroys the persistent connection. At this point, as earlier noted in connection with FIG. 9, server 202 waits to be called into service by another client, continues to serve other clients such as client 301 and client 302, and/or waits to be recalled by client 201 if and when client 201 regains operability.

The present embodiments are to be considered in all respects as illustrative and not restrictive. The requests need not be written in XML but could be written in any other suitable object-oriented, text-based computer language. The client application and server CIMOM and other code need not be written in JAVA and C++ respectively, but could be written in any other suitable object-oriented high level computer language compatible with the selected text-based language. The software need not be housed on the client or server, but could be housed in a dedicated server or possibly on the user interface itself. The present invention is applicable wherever a client-server network is used and is not limited to storage system servers or networks.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a general purpose computer or processor, the machine becomes an apparatus for practicing the invention because the program code combines with the machine to provide a unique apparatus that operates analogously to operation of specific logic circuits. Methods and apparatus of the present invention may also be embodied in forms of program code that are transmitted over a transmission medium, such as over electrical wiring or cabling, through fiber optics, or via any other transmission medium.

Moreover, the flowcharts used herein to demonstrate various aspects of the invention should not be construed to limit the present invention to any particular logic flow or logic implementation. The described logic may be partitioned into different logic blocks, (e.g., programs, modules, functions, or subroutines) without changing the overall results or otherwise departing from the true scope of the invention. The present invention may be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

Therefore, the scope of the invention is indicated by the appended claims rather than by the foregoing description, and all changes which come within the meaning and range of equivalency of the claims are therefore intended to be embraced therein.

What is claimed is:

1. A computer program product for use in a client-server network having a plurality of objects, said computer program product configured to run on said client and/or said server, said server having a plurality of processors, said computer program product including a computer usable storage medium having computer readable program code thereon for handling failure while monitoring state of at least certain of said objects, said program code comprising:

program code for establishing one of said plurality of processors to be active and all other of said plurality of processors to be inactive in said network;

program code for determining if said one of said plurality of processors is operative; and failover program code, responsive to running of said determining program code determining that said one of said plurality of processors is not operative, for establishing one of said all other of said plurality of processors to be active in said network;

wherein said monitoring state of at least certain of said objects comprises processing indications of said at least certain of said objects and said active processor processes said indications;

wherein said determining program code includes heartbeating program code for periodically polling said active processor to elicit a response indicative of operability or non-operability of said active processor; and wherein said failover program code comprises program code for sequentially polling individual ones of said all other of said plurality of processors to elicit a response indicative of operability or non-operability of said individual ones of said all other of said plurality of processors.

2. The computer program product of claim 1 further comprising program code for stopping operation of said sequentially polling program code when a response from a particular one of said individual ones of said all other of said plurality of processors is indicative of operability and for selecting said particular one of said other of said plurality of processors as said active processor.

3. The computer program product of claim 1 further comprising program code, responsive to running of said sequentially polling program code not eliciting a response indicative of operability from any of said all other of said plurality of processors, for polling each of said plurality of processors in repetitive sequence until a response from any one of said plurality of processors is indicative of operability and for selecting said any one of said plurality of processors as said active processor.

4. The computer program product of claim 1 and wherein said server is a storage system and said processors are storage processors.

5. The computer program product of claim 4 wherein said storage processors are defined within a cluster object limited to two processors.

6. In a client-server network having a plurality of objects, at least one client and at least one server including a plurality of processors, a method for handling failure while monitoring state of at least certain of said objects, said method comprising:

establishing one of said plurality of processors to be active and all other of said plurality of processors to be inactive in said network;

determining if said one of said plurality of processors is operative; and, further establishing one of said all other of said plurality of processors to be active in said network if said one of said plurality of processors is not operative;

wherein said monitoring state of at least certain of said objects comprises processing indications of said at least certain of said objects through said active processor;

wherein said determining includes heartbeating for periodically polling said active processor to elicit a response indicative of operability or non-operability of said active processor; and wherein said further establishing comprises sequentially polling individual ones of said all other of said plurality of processors to elicit a response indicative of operability or non-operability of said individual ones of said all other of said plurality of processors.

7. The method of claim 6 further comprising:

stopping operation of said sequentially polling means when a response from a particular one of said individual ones of said all other of said plurality of processors is indicative of operability; and, selecting said particular one of said other of said plurality of processors as said active processor.

8. The method of claim 6 further comprising:

polling each of said plurality of processors in repetitive sequence until a response from any one of said plurality of processors is indicative of operability if said sequentially polling does not elicit a response indicative of operability from any of said all other of said plurality of processors; and, selecting said any one of said plurality of processors as said active processor.

9. The method of claim 6 wherein said server is a storage system and said processors are storage processors.

10. The method of claim 9 wherein said storage processors are defined within a cluster object limited to two processors.

11. In a client-server network having a plurality of objects, at least one client and at least one server, a system for handling failure while monitoring state of at least certain of said objects, said system comprising:
   a plurality of processors within said server;
   means for establishing one of said plurality of processors to be active and all other of said plurality of processors to be inactive in said network;
   means for determining if said one of said plurality of processors is operative; and
   failover means, responsive to operation of said determining means determining that said one of said plurality of processors is not operative, for establishing one of said all other of said plurality of processors to be active in said network;
   wherein said monitoring state of at least certain of said objects comprises processing indications of said at least certain of said objects and said active processor processes said indications;
   wherein said determining means includes heartbeating means for periodically polling said active processor to elicit a response indicative of operability or non-operability of said active processor; and
   wherein said failover means comprises means for sequentially polling individual ones of said all other of said plurality of processors to elicit a response indicative of operability or non-operability of said individual ones of said all other of said plurality of processors.

12. The system of claim 11 further comprising means for stopping operation of said sequentially polling means when a response from a particular one of said individual ones of said all other of said plurality of processors is indicative of operability and for selecting said particular one of said other of said plurality of processors as said active processor.

13. The system of claim 11 further comprising means, responsive to operation of said sequentially polling means not eliciting a response indicative of operability from any of said all other of said plurality of processors, for polling each of said plurality of processors in repetitive sequence until a response from any one of said plurality of processors is indicative of operability and for selecting said any one of said plurality of processors as said active processor.

14. The system of claim 11 and wherein said server is a storage system and said processors are storage processors.

15. The system of claim 14 wherein said storage processors are defined within a cluster object limited to two processors.

16. A computer program product for use in a client-server network having a plurality of objects, said computer program product configured to run on said client and/or said server, said server having a plurality of processors, said computer program product including a computer usable storage medium having computer readable program code thereon for handling failure while processing indications of at least certain of said objects, said program code comprising:
   program code for causing said server to dedicate certain resources in said server to achieve said processing;
   program code for determining if said client is operative; and,
   program code, responsive to the running of said determining program code determining that said client is not operative, for dismantling said resources;
   wherein said resources comprise:
      a persistent pipe connection between said client and said server; and,
      at least one indication subscription residing in said server and subscribed by said client.

17. In a client-server network having a plurality of objects, at least one client and at least one server, a system for handling failure while processing indications of at least certain of said objects, said system comprising:
   system component for causing said server to dedicate certain resources in said server to achieve said processing;
   system component for determining if said client is operative; and,
   system component, responsive to operation of said determining system component determining that said client is not operative, for dismantling said resources;
   wherein said resources comprise:
      a persistent pipe connection between said client and said server; and,
      at least one indication subscription residing in said server and subscribed by said client.

18. In a client-server network having a plurality of objects, at least one client and at least one server, a method for handling failure while processing indications of at least certain of said objects, said method comprising:
   causing said server to dedicate certain resources in said server to achieve said processing;
   determining if said client is operative; and,
   dismantling said resources if said client is not operative;
   wherein said resources comprise:
      a persistent pipe connection between said client and said server; and,
      at least one indication subscription residing in said server and subscribed by said client.

19. In a client-server network having a plurality of objects, at least one client and at least one server, apparatus for handling failure while processing indications of at least certain of said objects, said apparatus comprising:
   first apparatus causing said server to dedicate certain resources to achieve said processing, said certain resources comprising at least a persistent pipe connection between said client and said server and at least one indication subscription residing in said server and subscribed by said client;
   second apparatus determining if said client is operative; and,
   third apparatus, responsive to operation of said second apparatus determining that said client is not operative, for dismantling said resources.

20. A computer program product for use in a client-server network having a plurality of objects, said computer program product configured to run on said client and/or said server, said server having a plurality of processors, said computer program product including a computer usable storage medium having computer readable program code thereon for handling failure while monitoring state of at least certain of said objects, said client having caused said server to dedicate certain resources in said server to achieve said monitoring, said program code comprising:
   program code for establishing one of said plurality of processors to be active and all other of said plurality of processors to be inactive in said network;

program code for determining if said one of said plurality of processors is operative; and failover program code, responsive to running of said determining program code determining that said one of said plurality of processors is not operative, for establishing one of said all other of said plurality of processors to be active in said network;

program code for determining if said client is operative; and program code, responsive to execution of said operative client determining program code determining that said client is not operative, for dismantling said resources;

wherein said resources include a persistent pipe connection between said client and said server.

21. A computer program product for use in a client-server network having a plurality of objects, said computer program product configured to run on said client and/or said server, said server having a plurality of processors, said computer program product including a computer usable storage medium having computer readable program code thereon for handling failure while monitoring state of at least certain of said objects, said client having caused said server to dedicate certain resources in said server to achieve said monitoring, said program code comprising:

program code for establishing one of said plurality of processors to be active and all other of said plurality of processors to be inactive in said network;

program code for determining if said one of said plurality of processors is operative; and failover program code, responsive to running of said determining program code determining that said one of said plurality of processors is not operative, for establishing one of said all other of said plurality of processors to be active in said network;

program code for determining if said client is operative; and program code, responsive to execution of said operative client determining program code determining that said client is not operative for dismantling said resources;

wherein said resources include observer infrastructure.

22. In a client-server network having a plurality of objects, at least one client and at least one server including a plurality of processors, a method for handling failure while monitoring state of at least certain of said objects, said client having caused said server to dedicate certain resources in said server to achieve said monitoring, said method comprising:

establishing one of said plurality of processors to be active and all other of said plurality of processors to be inactive in said network;

determining if said one of said plurality of processors is operative;

further establishing one of said all other of said plurality of processors to be active in said network if said one of said plurality of processors is not operative;

determining if said client is operative; and dismantling said resources if said client is not operative;

wherein said resources include a persistent pipe connection between said client and said server.

23. In a client-server network having a plurality of objects, at least one client and at least one server including a plurality of processors, a method for handling failure while monitoring state of at least certain of said objects, said client having caused said server to dedicate certain resources in said server to achieve said monitoring, said method comprising:

establishing one of said plurality of processors to be active and all other of said plurality of processors to be inactive in said network;

determining if said one of said plurality of processors is operative;

further establishing one of said all other of said plurality of processors to be active in said network if said one of said plurality of processors is not operative;

determining if said client is operative; and dismantling said resources if said client is not operative;

wherein said resources include observer infrastructure.

24. In a client-server network having a plurality of objects, at least one client and at least one server, a system for handling failure while monitoring state of at least certain of said objects, said client having caused said server to dedicate certain resources in said server to achieve said monitoring, said system comprising:

a plurality of processors within said server;

means for establishing one of said plurality of processors to be active and all other of said plurality of processors to be inactive in said network;

means for determining if said one of said plurality of processors is operative;

failover means, responsive to operation of said determining means determining that said one of said plurality of processors is not operative, for establishing one of said all other of said plurality of processors to be active in said network;

means for determining if said client is operative; and means, responsive to operation of said operative client determining means determining that said client is not operative, for dismantling said resources;

wherein said resources comprise a persistent pipe connection between said client and said server and observer infrastructure.

25. In a client-server network having a plurality of objects, at least one client and at least one server, a system for handling failure while monitoring state of at least certain of said objects, said client having caused said server to dedicate certain resources in said server to achieve said monitoring, said system comprising:

a plurality of processors within said server;

means for establishing one of said plurality of processors to be active and all other of said plurality of processors to be inactive in said network;

means for determining if said one of said plurality of processors is operative;

failover means, responsive to operation of said determining means determining that said one of said plurality of processors is not operative, for establishing one of said all other of said plurality of processors to be active in said network;

means for determining if said client is operative; and means, responsive to operation of said operative client determining means determining that said client is not operative, for dismantling said resources;

wherein said resources include observer infrastructure.

* * * * *